(12) United States Patent
Oh (10) Patent No.: US 7,427,051 B2
(45) Date of Patent: Sep. 23, 2008

(54) SNAP CLAMP FOR MOUNTING SPRINKLER (75) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 0 days.

(21) Appl. No.: 11/543,205

(22) Filed: Oct. 5, 2006

(65) Prior Publication Data

US 2008/0083852 A1 Apr. 10, 2008

(51) Int. Cl.
*F16L 3/00* (2006.01)
(52) U.S. Cl. .............................. 248/73; 248/72; 248/75
(58) Field of Classification Search ................... 248/73, 248/75, 62, 65, 343, 72; 52/506.07, 715; 169/16, 17, 37, 41
See application file for complete search history.

(56) References Cited

U.S. PATENT DOCUMENTS

| | | | | |
|---|---|---|---|---|
| 833,613 | A | * | 10/1906 | Maiser ......................... 248/57 |
| 4,041,657 | A | * | 8/1977 | Schuplin ......................... 52/39 |
| 4,717,099 | A | * | 1/1988 | Hubbard ...................... 248/57 |
| 6,554,231 | B2 | * | 4/2003 | Choi ........................... 248/65 |
| 6,811,130 | B1 | * | 11/2004 | Oh .............................. 248/343 |
| 7,240,884 | B2 | * | 7/2007 | Shim ........................... 248/342 |

* cited by examiner

*Primary Examiner*—Korie H. Chan
(74) *Attorney, Agent, or Firm*—Jacobson Holman PLLC (57) ABSTRACT

A snap clamp, in which a head member and a coupling member are supplied with the head member and the coupling member coupled to each other, and are mounted to a stock bar at a desired site without the disassembly. The snap clamp for mounting a sprinkler includes a main body bent into a 'U' shape and formed such that a width of the main body is greater than a diameter of a head member. A screw hole is formed in one wall of the main body. A fastening member is fastened to the screw hole, with a holding part provided on the fastening member and protruding outwards. Space extends from the wall such that the head member is vertically fitted into the space. A through fitting part is formed in each sidewall of the main body, a height thereof corresponding to a height of a stock bar and a width thereof being larger than a width of the stock bar so that the main body is movable leftwards and rightwards while the stock bar is fitted into the through fitting part. An inlet is provided at a lower position of the through fitting part in such a way as to correspond to the width of the stock bar. A support step protrudes at the lower position of the through fitting part excluding the inlet, thus allowing the stock bar to be fitted into the through fitting part through the inlet.

1 Claim, 11 Drawing Sheets

SNAP CLAMP FOR MOUNTING SPRINKLER

BACKGROUND OF THE INVENTION

1. Field of the Invention

The present invention relates generally to a snap clamp for mounting a sprinkler and, more particularly, to a snap clamp which is used to mount a sprinkler, in the state where a head member is coupled to a coupling member.

2. Description of the Related Art

Generally, a stock bar is installed above horizontal members each having on the upper portion thereof a locking part to be perpendicular to the horizontal members. A snap clamp is mounted to the stock bar for the installation of a sprinkler.

Figure 1:
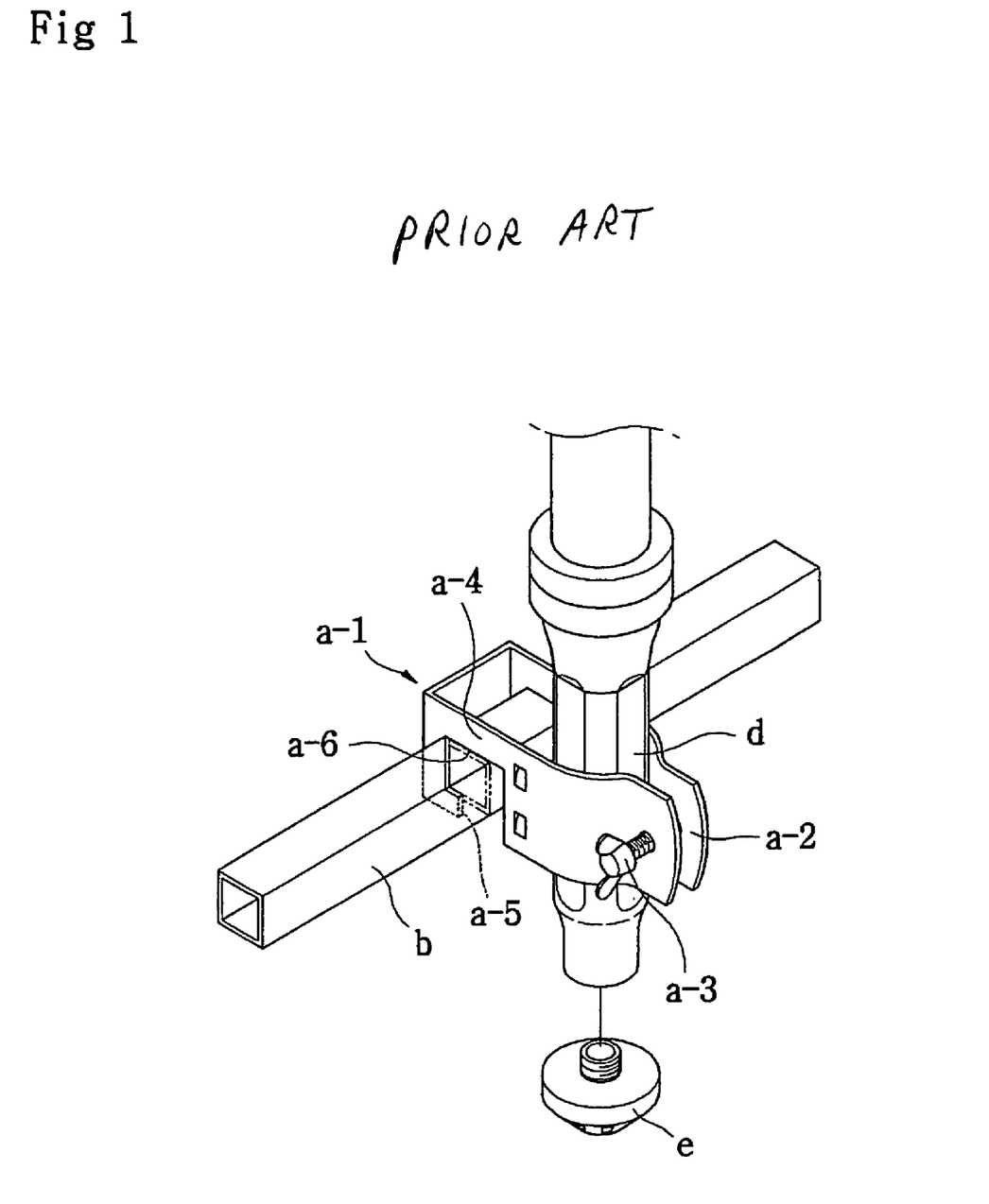
FIG. 1 is a perspective view showing the installed state of a conventional snap clamp.
Figure 2:
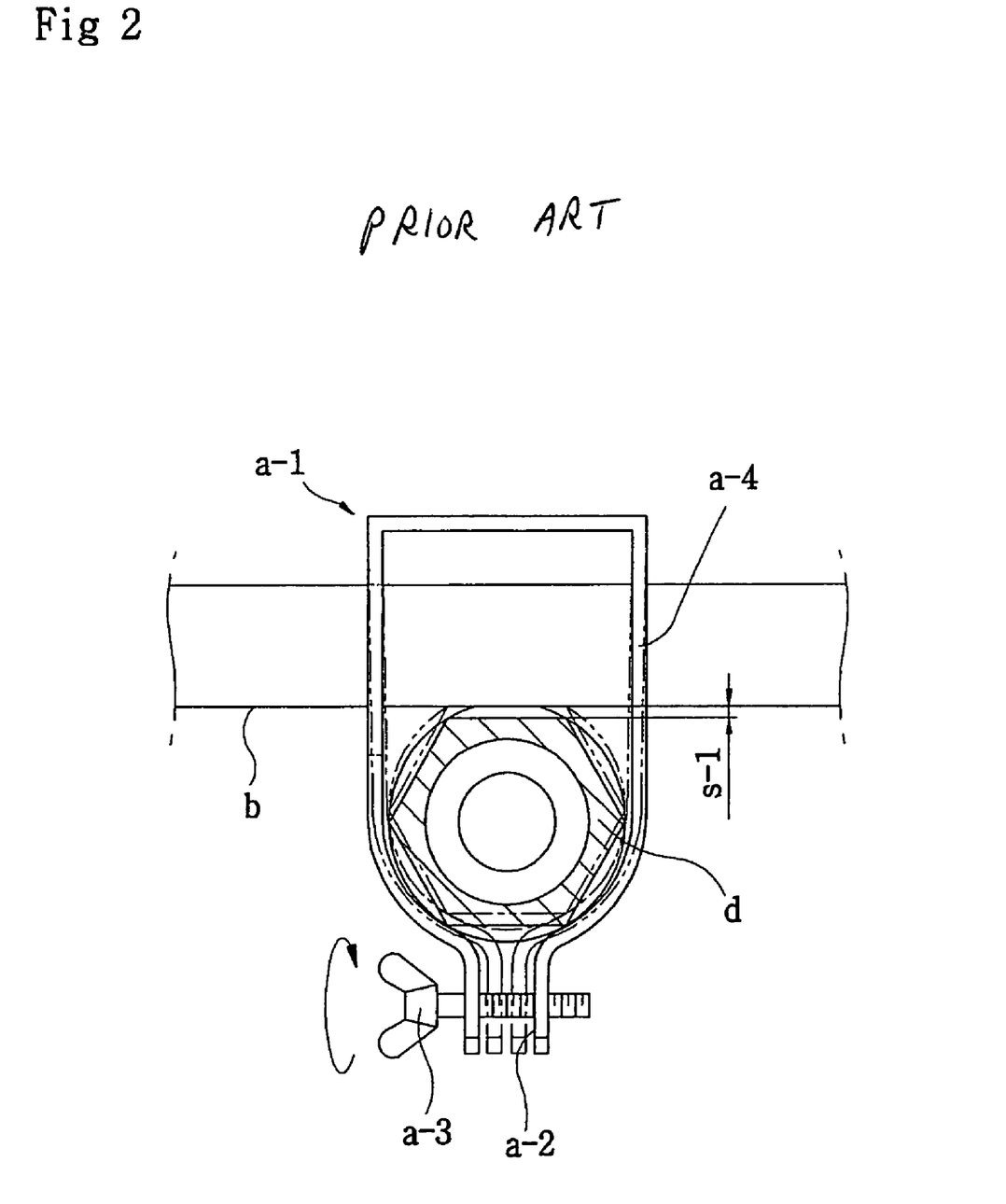
FIG. 2 is a plan view showing the state where a sprinkler is mounted to the snap clamp of FIG. 1.

FIGS. 1 and 2 are views showing a conventional snap clamp. As shown in the drawings, the snap clamp includes a main body a-1 and fitting parts a-6. The main body a-1 is closed at one end thereof, and is bent at the other end thereof to define an opening a-2 which is tightened using a fastening member a-3. The fitting parts a-6 are formed in both sidewalls a-4 of the main body a-1, so that the stock bar b is fitted into the fitting parts a-6 through inlets a-5.

The installation of the conventional snap clamp is as follows. That is, in the state where the stock bar b is fitted into the fitting parts a-6 through the inlets a-5, a coupling member d is put between the opening a-2 and the stock bar b, and the fastening member a-3 is tightened. At this time, the opening a-2 is closed, so that the coupling member d comes into close contact with the stock bar b to be firmly coupled to the stock bar b.

Meanwhile, the conventional snap clamp permits only a tolerance s-1 corresponding to the extent that it is tightened by the fastening member a-3. However, the diameter of a head member e is larger than that of the coupling member d. Thus, the conventional snap clamp is problematic in that an additional process of mounting the head member e to the coupling member d is required after the coupling member d has been mounted to the stock bar b. Meanwhile, when the extent that it is tightened by the fastening member a-3, that is, the tolerance s-1, is set to be large enough to pass the head member e, the coupling member d is not in close contact with the stock bar b with the tightening force of the fastening member a-3.

Figure 3:
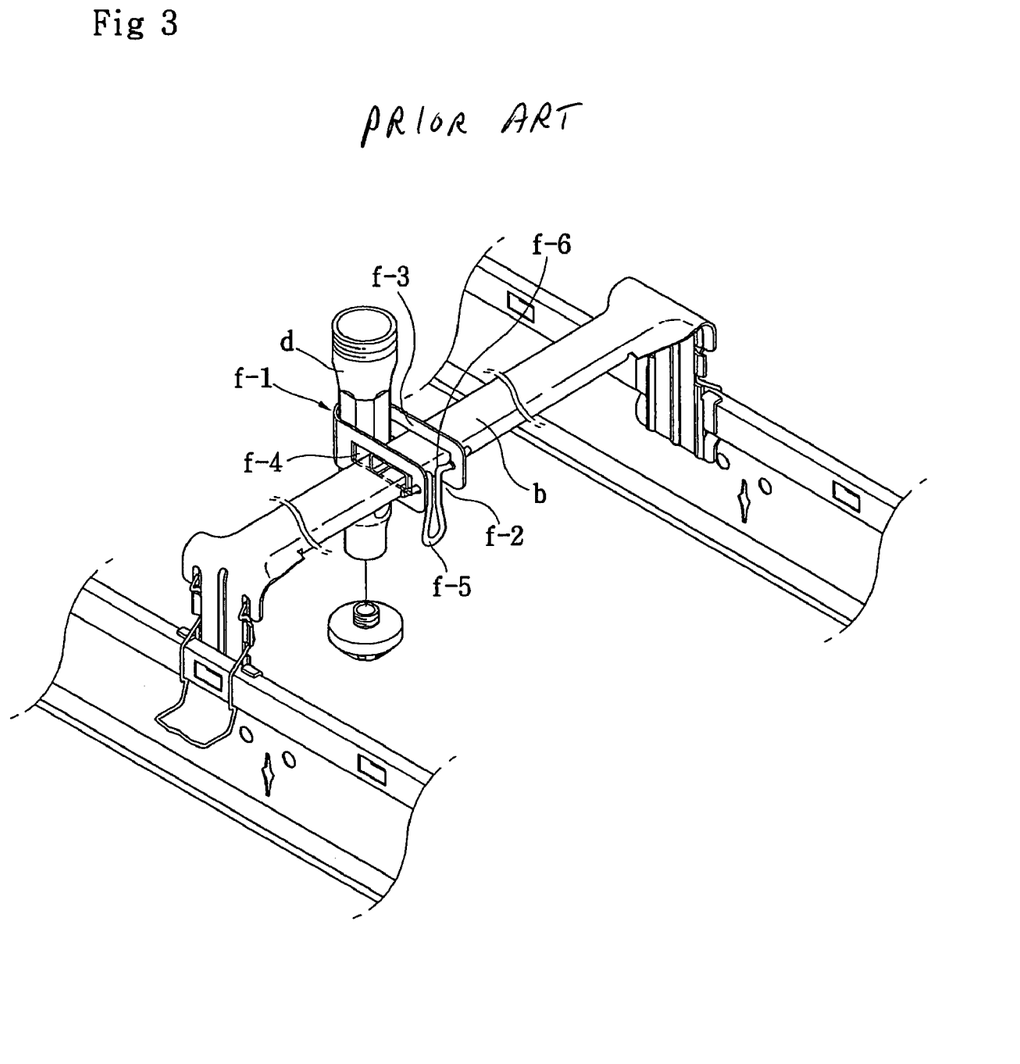
FIG. 3 is a perspective view showing the installed state of another conventional snap clamp.
Figure 4:
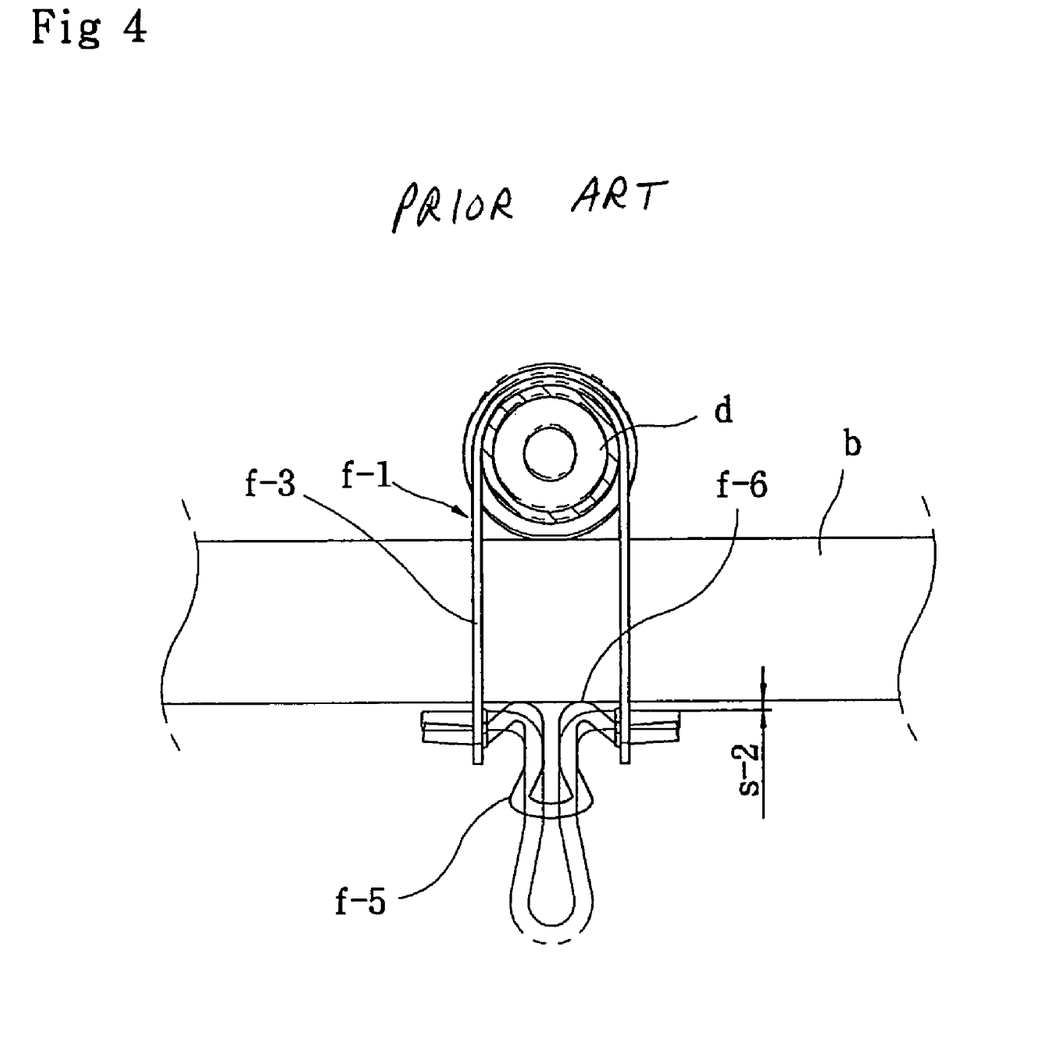
FIG. 4 is a plan view showing the state where a sprinkler is mounted to the snap clamp of FIG. 3.
Figure 5:
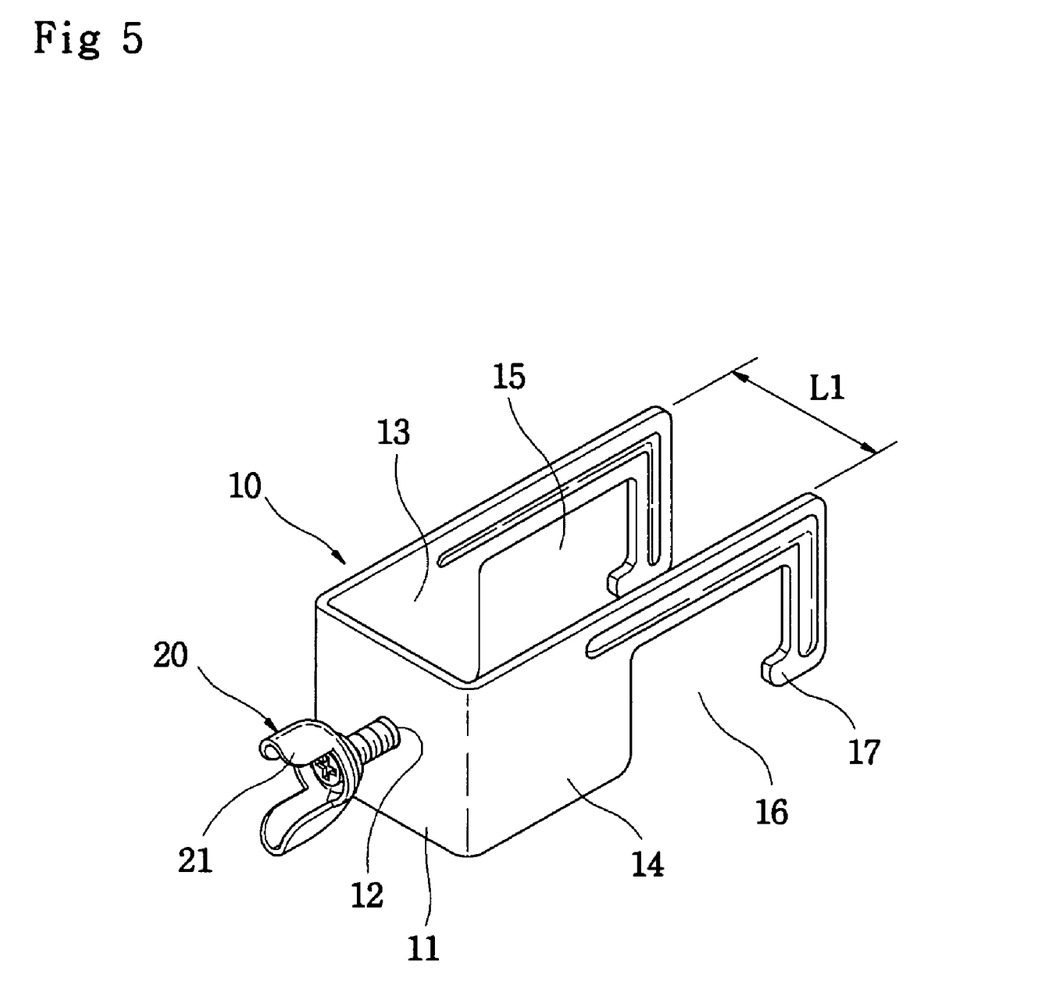
FIG. 5 is a perspective view showing a snap clamp, according to the present invention.

FIGS. 3 and 4 are views showing the state where a conventional snap clamp, according to U.S. patent application Ser. No. 11/066.233, which was filed by the applicant of the present invention, is mounted to a stock bar.

The snap clamp includes a main body f-1, fitting parts f-4, and a compression member f-5. The main body f-1 is closed at one end thereof, and has at the other end thereof an opening f-2. The fitting parts f-4 are provided in both sidewalls f-3 of the main body f-1, so that a stock bar b is fitted into the fitting parts f-4. The compression member f-5 is rotatably mounted to the opening f-2. When a coupling member d is fitted between the main body f-1 and the stock bar b and the compression member f-5 is rotated, a compression part f-6 of the compression member f-5 contacts the stock bar b and pulls the main body f-1. Thereby, the coupling member d is firmly coupled to the stock bar b.

However, the snap clamp proposed by the applicant of the invention is problematic in that the tolerance s-2 permitted by the compression part f-6 of the compression member f-5 is limited by the structure, so that it is impossible to fit the stock bar into the main body f-1 of the snap clamp in the state where a head member e is coupled to the coupling member d.

SUMMARY OF THE INVENTION

Accordingly, the present invention has been made keeping in mind the above problems occurring in the prior art, and an object of the present invention is to provide a snap clamp, in which a head member and a coupling member are supplied and sold by a seller with the head member and the coupling member coupled to each other, and are mounted to a stock bar at a desired site without the necessity to disassemble the head member and the coupling member from each other.

Another object of the present invention is to provide a snap clamp, which solves the problem of the prior art, in which a head member must be coupled to a coupling member after the coupling member has been mounted to a stock bar.

In order to accomplish the above objects, the present invention provides a snap clamp for mounting a sprinkler, including a main body which is bent into a 'U' shape and is formed such that a width of the main body is greater than a diameter of a head member, a screw hole formed in one wall of the main body, a fastening member fastened to the screw hole, with a holding part provided on the fastening member and protruding outwards, space extending from the wall such that the head member is vertically fitted into the space, a through fitting part formed in each sidewall of the main body, a height thereof corresponding to a height of a stock bar and a width thereof being larger than a width of the stock bar so that the main body is movable leftwards and rightwards while the stock bar is fitted into the through fitting part, an inlet provided at a lower position of the through fitting part in such a way as to correspond to the width of the stock bar, and a support step protruding at the lower position of the through fitting part excluding the inlet, thus allowing the stock bar to be fitted into the through fitting part through the inlet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiment of the present invention will be described in detail with reference to the accompanying drawings.

As shown in FIG. 5 and FIGS. 6A, 6B, and 6C, a snap clamp for mounting a sprinkler, according to the present invention, includes a main body 10, a screw hole 12, a fastening member 20, space 13, through fitting parts 15, inlets 16, and support steps 17. The main body 10 is bent into a 'U' shape, and is formed such that the width L1 of the main body 10 is larger than the diameter of a head member 50. The screw hole 12 is formed in one wall 11 of the main body 10. The fastening member 20 is fastened to the screw hole 12, with a holding part 21 provided on the fastening member 20 to protrude outwards. The space 13 extends from the wall 11 such that the head member 50 is vertically fitted into the space 13. The through fitting parts 15 are formed in both sidewalls 14 of the main body 10. The height of each through fitting part 15 corresponds to the height H of a stock bar 30, and the width of each through fitting part 15 is greater than the width L2 of the stock bar 30, so that the main body 10 is movable leftwards and rightwards while the stock bar 30 is fitted into the through fitting parts 15. The inlet 16 is provided at a lower position of each through fitting part 15 in such a way as to correspond to the width of the stock bar 30. The support step 17 protrudes at the lower position of each through fitting part 15 excluding the inlet 16, thus allowing the stock bar 30 to be fitted into the through fitting part 15 through the inlet 16.

Figure 7A:
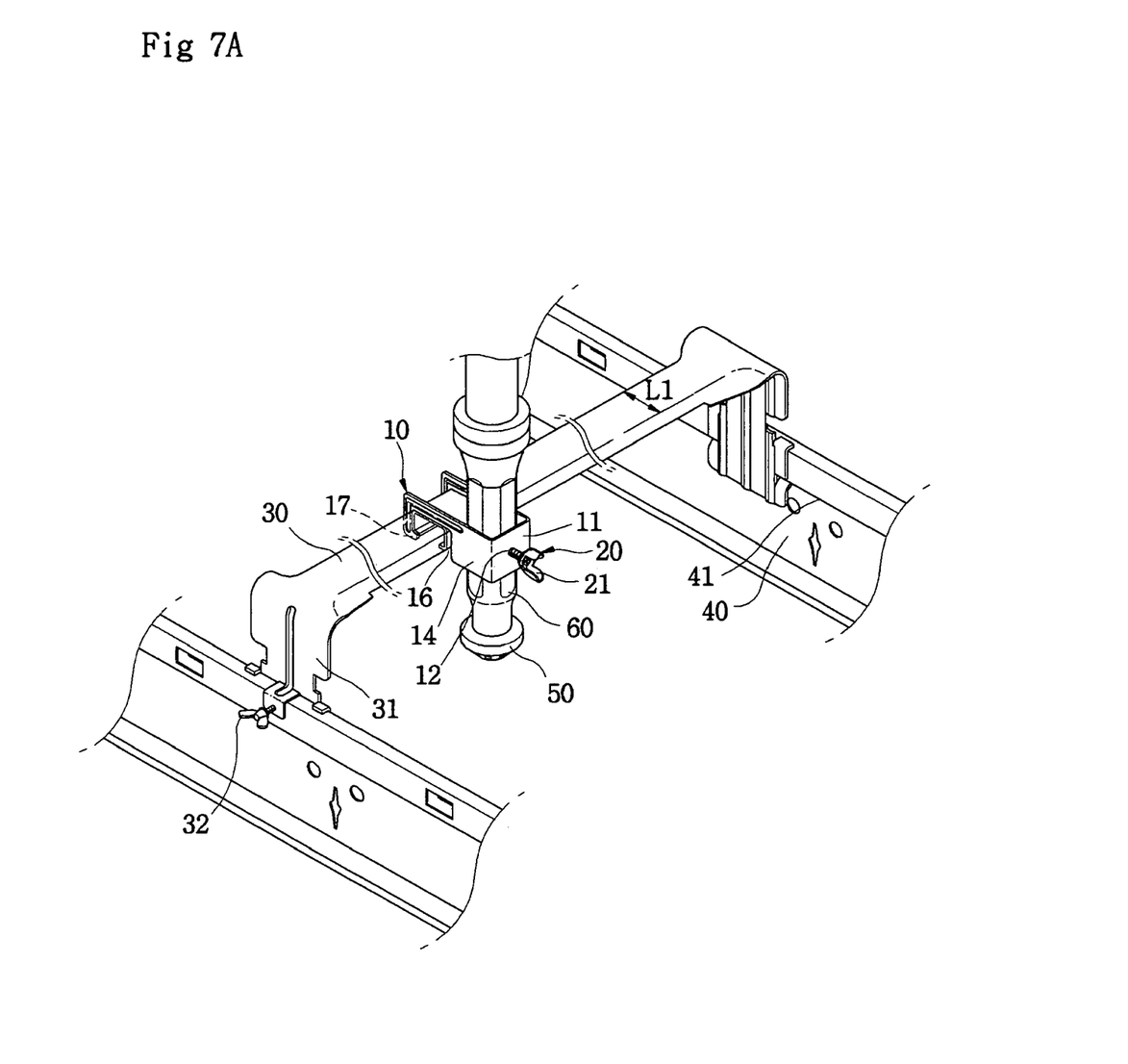
FIGS. 7A, 7B, and 7C are views showing the use of the snap clamp, according to the present invention.
Figure 7B:
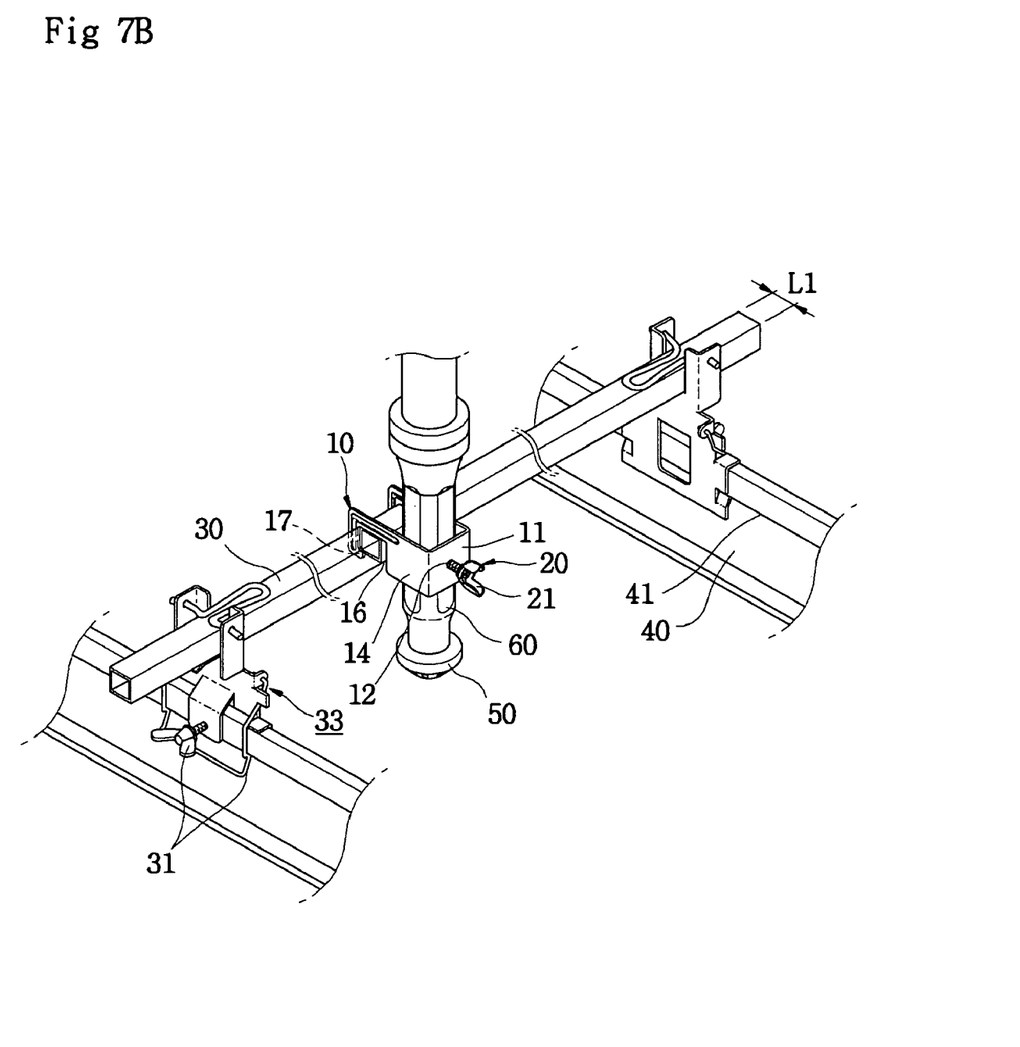

The stock bar 30 is the structure which is installed above horizontal members 40 to cross the horizontal members 40. Two types of stock bars may be used. That is, as shown in FIG. 7A, bent parts 31 each having a fastening member 32 which is fastened to a locking step 41 of a corresponding horizontal member 40 may be integrally provided on both sides of a stock bar 30. Further, as shown in FIG. 7B, a stock bar 30 and a coupling means 33 may be separately manufactured. The stock bar 30 has the shape of a rectangular pipe. Each coupling means 33 has a fastening member 31 to fasten the stock bar 30 to each horizontal member 40.

The sentence, "each through fitting part 15 and each inlet 16 correspond to the stock bar 30", means that the through fitting part 15 and the inlet 16 do not hinder the insertion of the stock bar 30.

Figure 7C:
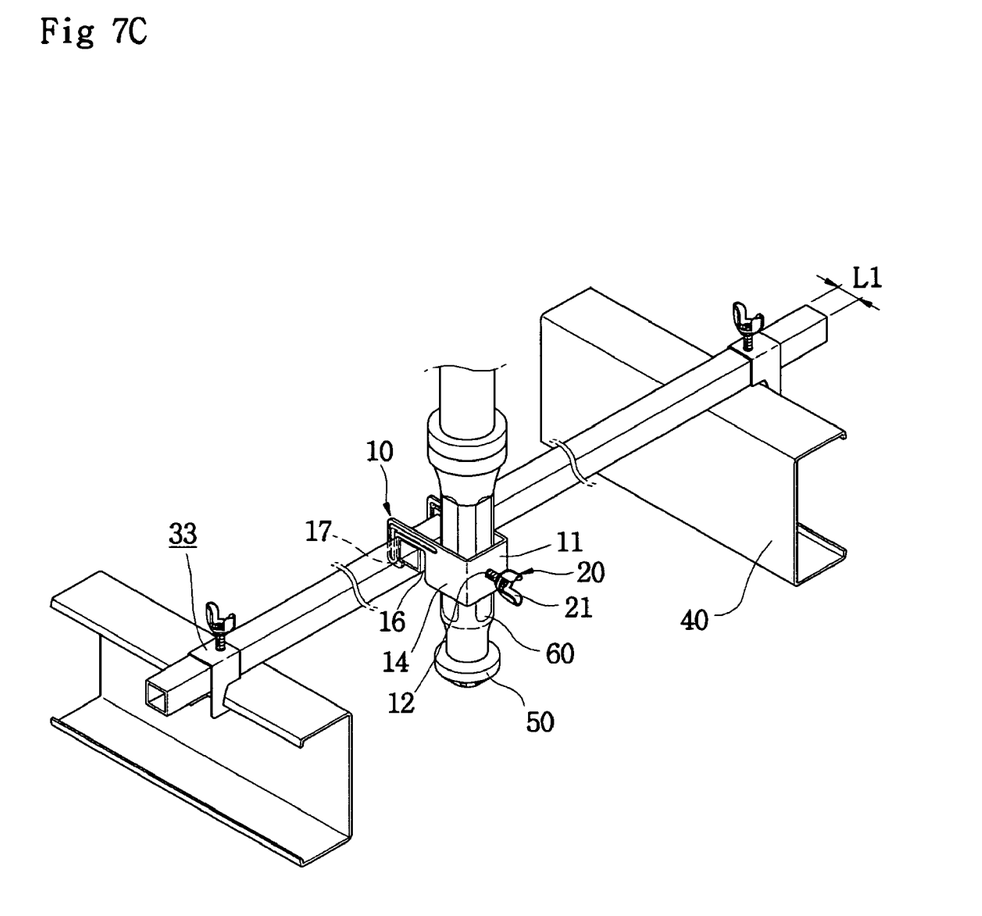

The horizontal member 40 can be one of two types. That is, a horizontal member having the cross section of an inverted "T" shape may be used. Alternatively, as shown in FIG. 7C, a horizontal member having the cross section of a "U" shape may be used.

The snap clamp of the present invention is used for all types of stock bars 30 and horizontal members 40.

The process of installing a sprinkler using the snap clamp of the present invention will be described below.

Figure 6A:
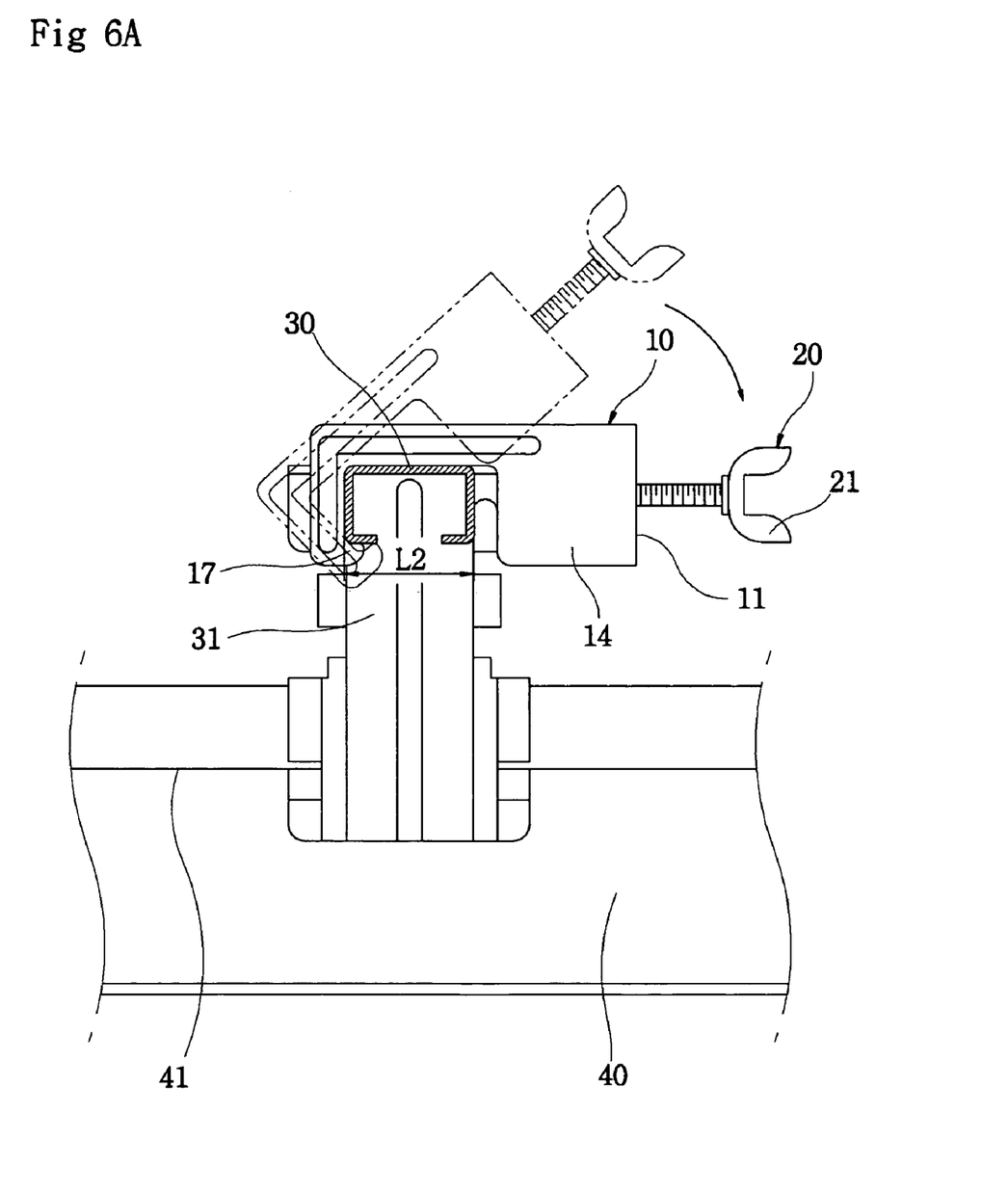
FIGS. 6A, 6B, and 6C are views showing the process of installing the sprinkler, using the snap clamp of the present invention.
Figure 6B:
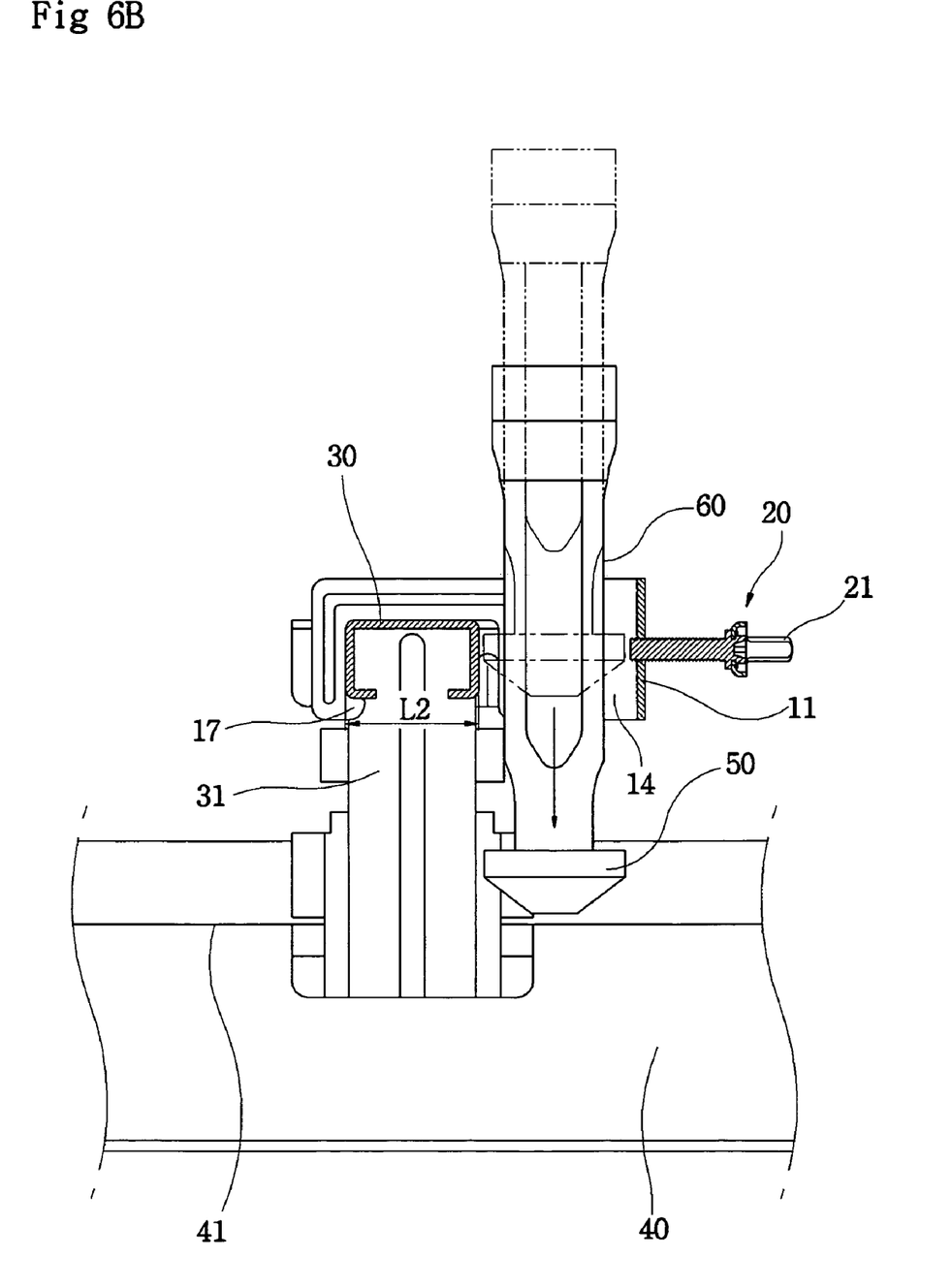

After the stock bar 30 is installed above the horizontal members 40 to cross the horizontal members 40, a worker fits the stock bar 30 into the through fitting parts 15 through the inlets 16. In such a state, as shown in FIG. 6B, the stock bar 30 is pulled such that the bottom of the stock bar 30 is supported on the support steps 17. Each inlet 16 is formed to be slightly larger than the width L2 of the stock bar 30, thus allowing the stock bar 30 to be smoothly fitted into each through fitting part 15. The width of each through fitting part 15 is larger than the width L2 of the stock bar 30 by the length of each support step 17. Thus, the main body 10 may be moved leftwards and rightwards relative to the stock bar 30 by the length of each support step 17.

Figure 6C:
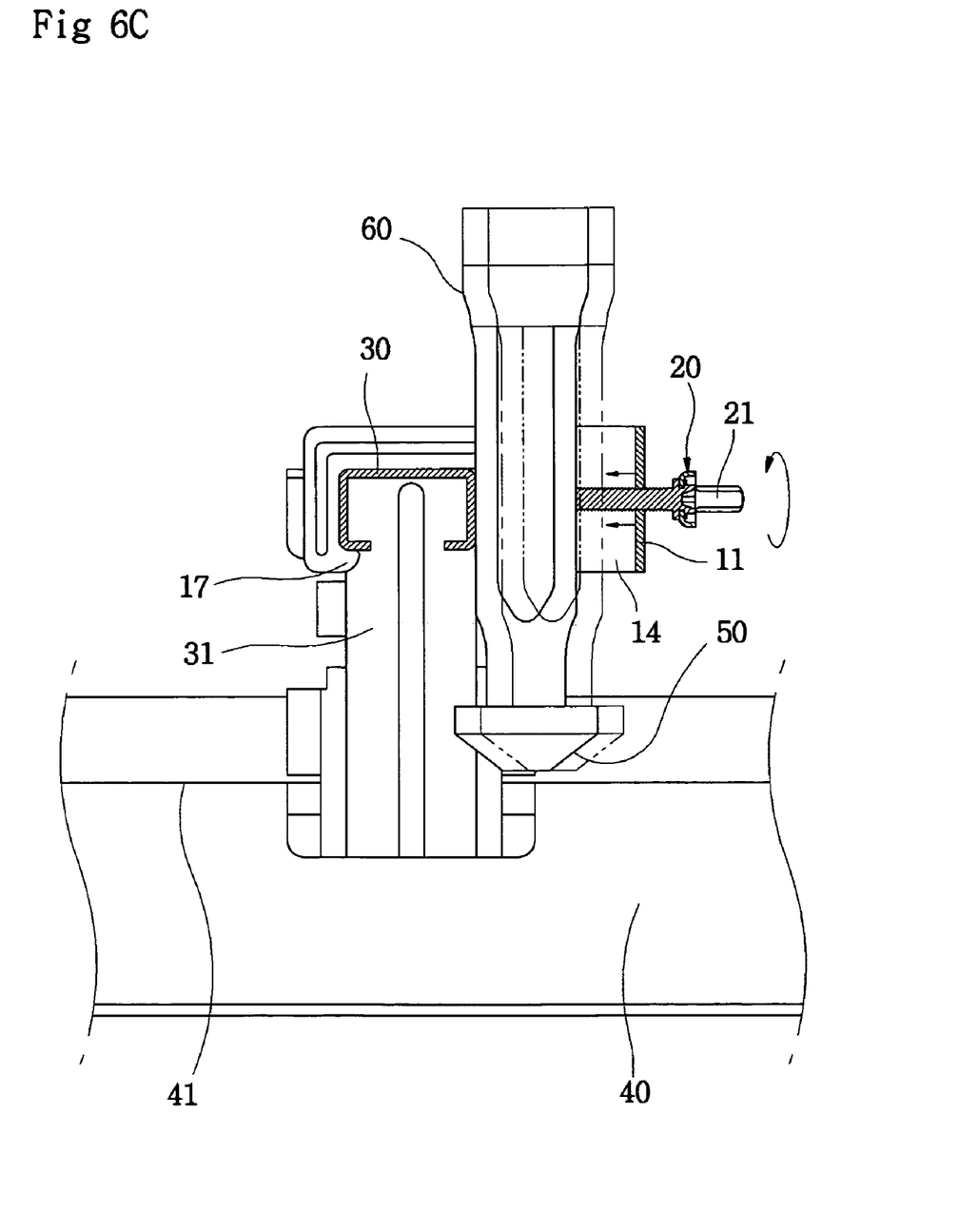

As such, in the state where the main body 10 is hooked on the stock bar 30, the head member 50 coupled to a coupling member 60 is passed through the space 13 to be located at a predetermined position, as shown in FIG. 6C. Thereafter, the fastening member 20, fastened to the screw hole 12 such that the holding part 21 protrudes to one side, is tightened, so that the coupling member 60 is in close contact with the stock bar 30. Thereby, the operation of installing the sprinkler is completed. That is, when the snap clamp of the present invention is used, the sprinkler is installed with the head member 50 coupled to the coupling member 60. Thus, unlike the prior art, it is unnecessary to fasten the head member 50 to the coupling member 60 after the coupling member 60 has been secured to the snap clamp. Further, since the installation is carried out while the head member 50 remains coupled with the coupling member 60, it is convenient to manage parts.

The space 13 is defined between the stock bar 30 and the wall 11. Since the distance between the stock bar 30 and the wall 11 and the width L1 of the main body 10 are larger than the diameter of the head member 50, the head member 50 may pass in a direction from an upper position to a lower position. Further, merely by loosening the fastening member 20, it is possible to easily adjust the position of the head member 50.

FIGS. 7A, 7B, and 7C are views showing the state where the snap clamp of the present invention is applied to structures having different types of stock bars 30 and horizontal members 40. The method of installing the sprinkler using the snap clamp is the same as the above-mentioned method.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A snap clamp assembly for mounting a sprinkler on a stock bar, said snap clamp assembly comprising:
   a coupling member of the sprinkler, said coupling member terminating in a head member, a diameter of said head member being greater than a diameter of said coupling member,
   a snap clamp including a main body being of a U-shape having one wall and two flat sidewalls extending from opposite side edges of the one wall, and a width of the main body being greater than the diameter of the head member;
   a screw hole formed in the one wall of the main body;
   a fastening member fastened to the screw hole, with a holding part provided on the fastening member and protruding outwards;
   a space defined between the one wall and the two flat sidewalls, the space accommodating the head member vertically fitted into the space;
   a through fitting part formed beyond said space in each of the two flat sidewalls of the main body, a height of the through fitting part corresponding to a height of the stock bar and a width thereof being larger than a width of the stock bar, the main body being movable leftwards and rightwards while the stock bar is fitted into the through fitting part;
   an inlet provided at a lower position of the through fitting part and corresponding to the width of the stock bar; and
   a support step extending perpendicular toward said one wall and protruding at the lower position of the through fitting part defining a side of the inlet, thus allowing the stock bar to be fitted into the through fitting part through the inlet,
   said fastening having an extension extending through said screw hole and engaging said coupling member to maintain a position of said coupling member, an the extension of said fastening member extends only to said coupling member thereby avoiding extension of said fastening member to said through fitting part and beyond said space.

* * * * *